(12) United States Patent
Tapperson

(10) Patent No.: US 6,918,114 B2
(45) Date of Patent: Jul. 12, 2005

(54) METHOD, APPARATUS, AND PROGRAM TO KEEP A JVM RUNNING DURING THE SHUTDOWN PROCESS OF A JAVA BASED SERVER EXECUTING DAEMON THREADS

(75) Inventor: Kevin Gary Tapperson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 09/826,759

(22) Filed: Apr. 5, 2001

(65) Prior Publication Data
US 2002/0174163 A1 Nov. 21, 2002

(51) Int. Cl.[7] ............................. G06F 9/455; G06F 9/46
(52) U.S. Cl. ........................... 718/1; 718/100; 718/102
(58) Field of Search .......................... 718/1, 100, 102, 718/10, 101, 103, 104, 108; 709/200, 201, 203, 310; 711/159

(56) References Cited

U.S. PATENT DOCUMENTS

| 5,555,399 A | * | 9/1996 | Waldron et al. ............. 711/159 |
| 5,668,994 A | | 9/1997 | Swagerman ................. 395/672 |
| 5,754,771 A | | 5/1998 | Epperson et al. ....... 395/200.33 |
| 5,884,022 A | * | 3/1999 | Callsen et al. ................. 714/22 |
| 5,961,584 A | * | 10/1999 | Wolf ........................... 718/103 |
| 6,070,173 A | | 5/2000 | Huber et al. ................. 707/206 |
| 6,085,120 A | | 7/2000 | Schwerdtfeger et al. ....... 700/90 |
| 6,134,627 A | | 10/2000 | Bak ............................... 711/6 |
| 6,374,286 B1 | * | 4/2002 | Gee et al. .................... 718/108 |
| 6,473,783 B2 | * | 10/2002 | Goshey et al. .............. 709/203 |

OTHER PUBLICATIONS

JAVA Threads, Scott Oaks & Henry Wong, 1999, Orieilly & Associates, Inc., pp. 164–168, 198–199, 208–214.*

* cited by examiner

Primary Examiner—Majid Banankhah
(74) Attorney, Agent, or Firm—Duke W. Yee; Jeffrey S. LaBaw; Stephen R. Tkacs

(57) ABSTRACT

A single normal Java thread referred to as a "waiter" thread is used to prevent premature exit of the Java Virtual Machine during the shutdown process of the server application by waiting for any daemon threads in the JVM to complete execution. Using this mechanism, any daemon thread flagged by the application runs to completion before the JVM is allowed to exit. Once all flagged daemon threads exit, the waiter thread exits and allows the server application to properly terminate. The waiter thread uses an efficient mechanism to maintain a queue of threads. When a daemon thread is flagged, it is simply appended to the end of the queue. The waiter thread waits for the first thread in the queue to complete. Once the first thread in the queue completes, it is removed from the queue. At this point, the queue is searched for any other inactive threads and those threads are also removed from the queue. This allows the waiter thread to efficiently manage the queue and keep the memory and resource requirements to a minimum.

17 Claims, 4 Drawing Sheets

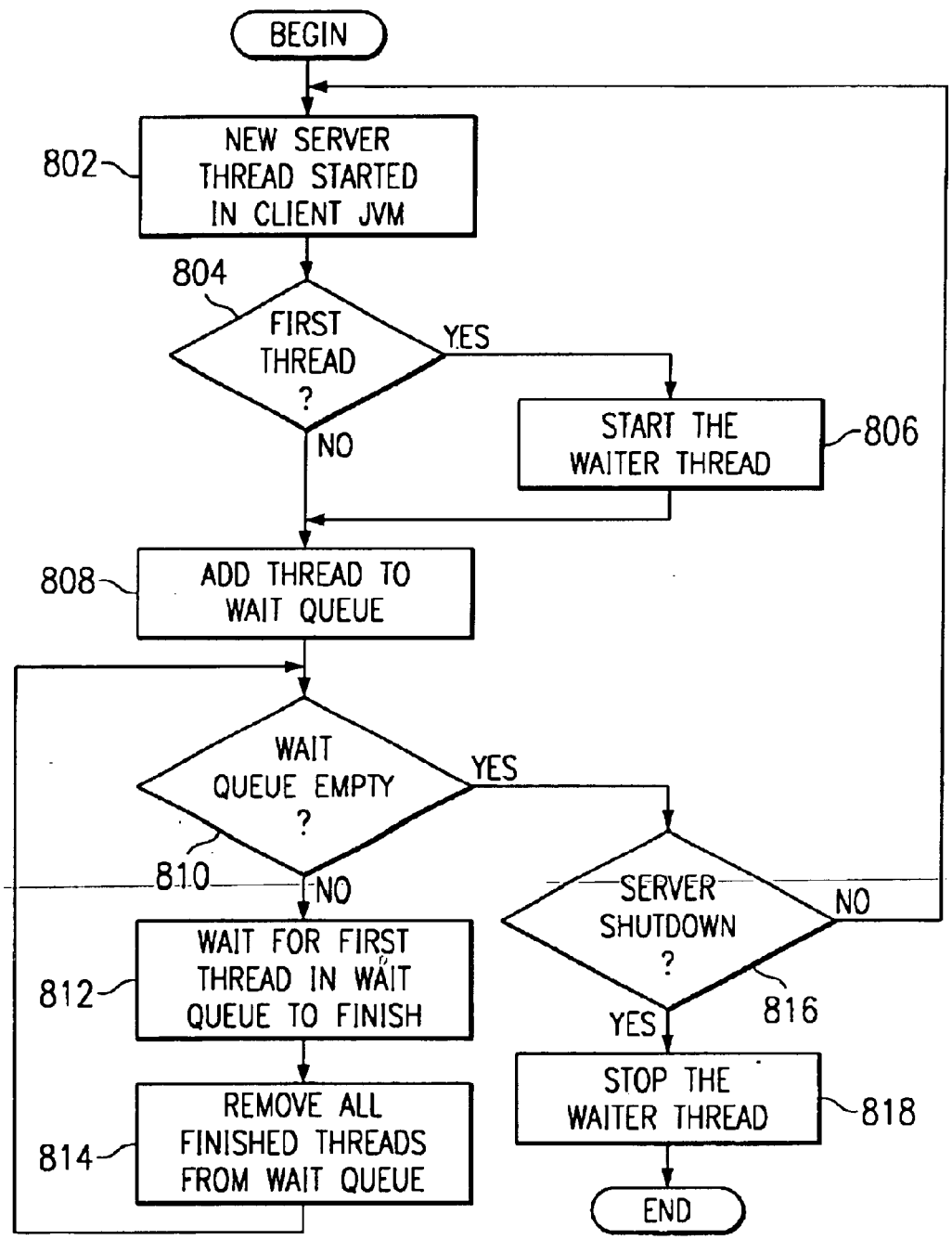

METHOD, APPARATUS, AND PROGRAM TO KEEP A JVM RUNNING DURING THE SHUTDOWN PROCESS OF A JAVA BASED SERVER EXECUTING DAEMON THREADS

BACKGROUND OF THE INVENTION

1. Technical Field

The present invention relates to data processing systems and, in particular, to the shutdown process of a Java based server. Still more particularly, the present invention provides a method, apparatus, and program for keeping a Java Virtual Machine running during the shutdown process of a Java based server executing daemon threads.

2. Description of Related Art

Java is a programming language designed to generate applications that can run on all hardware platforms without modification. Java was modeled after C++, and Java programs can be called from within hypertext markup language (HTML) documents or launched stand alone. The source code of a Java program is compiled into an intermediate language called "bytecode," which cannot run by itself. The bytecode must be converted (interpreted) into machine code at runtime. When running a Java application, a Java interpreter (Java Virtual Machine) is invoked. The Java Virtual Machine (JVM) translates the bytecode into machine code and runs it. As a result, Java programs are not dependent on any specific hardware and will run in any computer with the Java Virtual Machine software.

Remote Method Invocation (RMI) is a remote procedure call (RPC), which allows Java objects (software components) stored in a network to be run remotely. In the Java distributed object model, a remote object is one whose methods can be invoked from another JVM, potentially on a different host.

The Java Virtual Machine specification requires that the JVM exit when all non-daemon threads have finished execution. The JVM will exit when this condition is met regardless of the state of any daemon threads still running in the JVM. Thus, any data stored by or operations in progress by any daemon threads in the JVM may potentially be lost. Also, any persistent files that those threads are working with may potentially be corrupted or only partially updated, resulting in data files in an unknown state.

In a Java application in which the developer has control of the thread creation process, the developer may simply set important threads as normal (non-daemon) threads to ensure that these problems do not occur. However, in a Java application that uses RMI, the thread creation process is performed in the Java RMI code and cannot be altered. The Java RMI code automatically creates threads as daemon threads. Java threads can only be set as normal or daemon before they begin execution. Therefore, the use of RMI code may result in unavoidable problems when the JVM exits.

Therefore, it would be advantageous to provide a mechanism for keeping the JVM running during shutdown until the daemon threads complete execution.

SUMMARY OF THE INVENTION

The present invention creates a single normal Java thread referred to as a "waiter" thread. The waiter thread is used to prevent premature exit of the Java Virtual Machine during the shutdown process of the server application by waiting for any daemon threads in the JVM to complete execution. Using this mechanism, any daemon thread flagged by the application runs to completion before the JVM is allowed to exit. Once all flagged daemon threads exit, the waiter thread exits and allows the server application to properly terminate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart illustrating the operation of a server JVM implementing a waiter thread in accordance with a preferred embodiment of the present invention.

DETAILED DESCRIPTION OF THE PREFERRED EMBODIMENT

Figure 1:
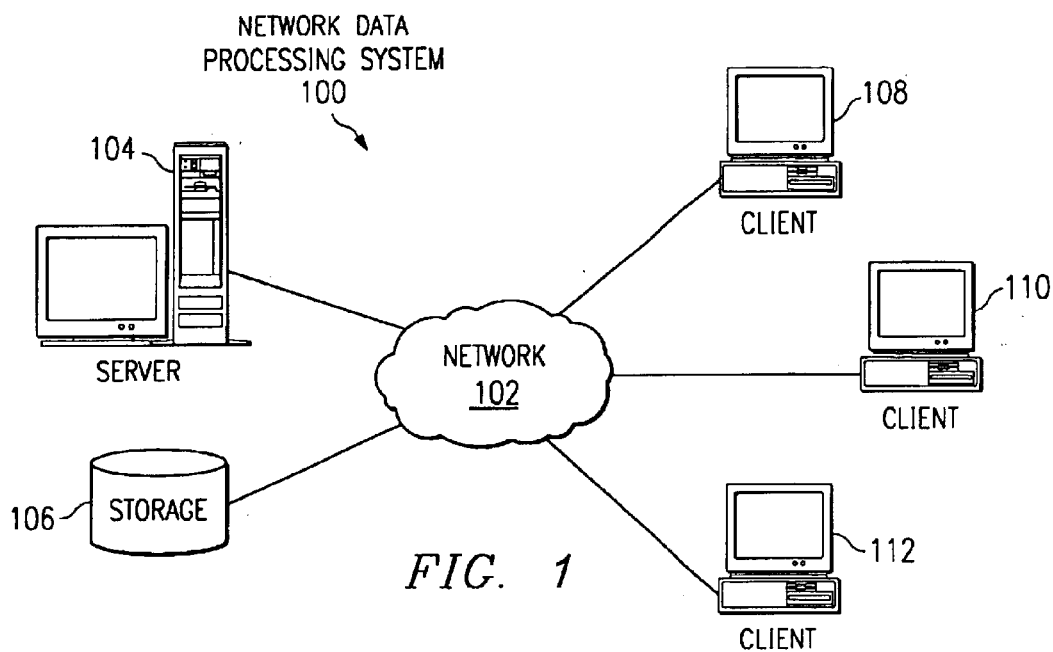
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
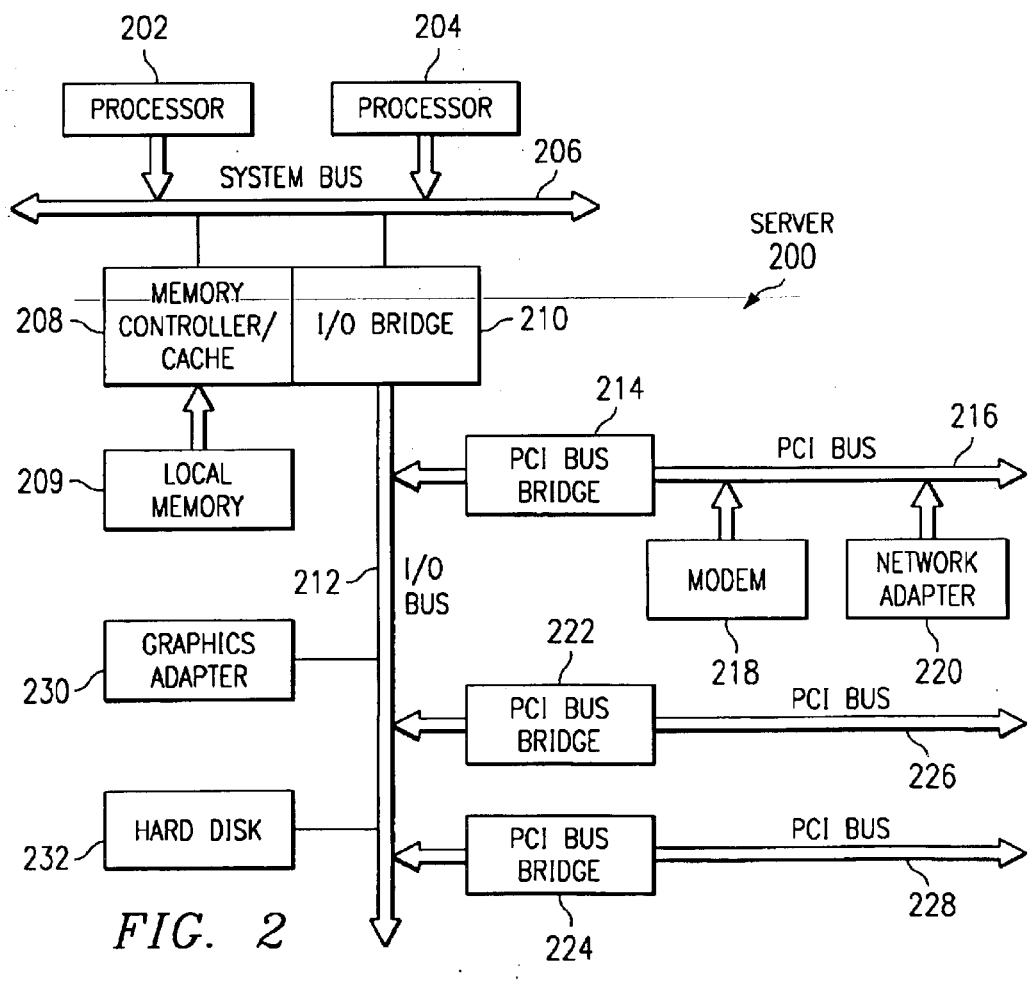
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
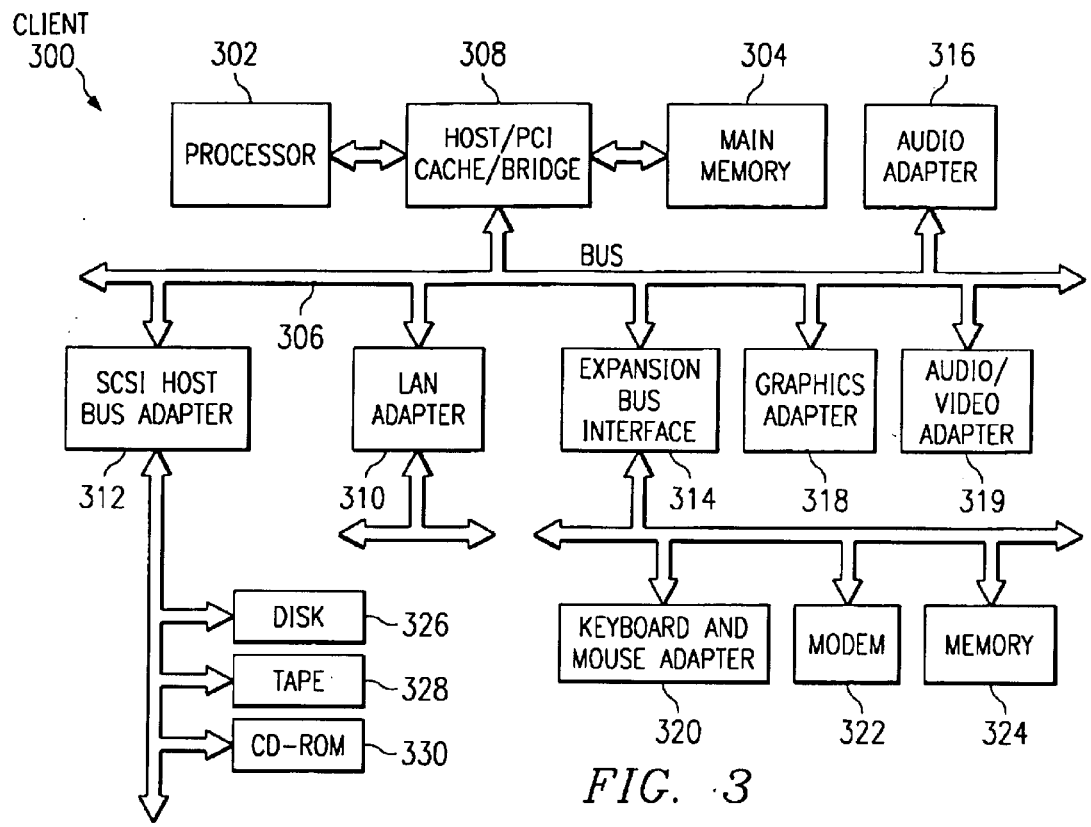
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
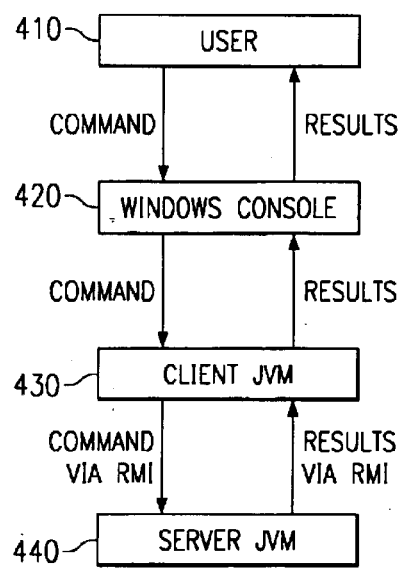
FIG. 4 is a block diagram illustrating Java Virtual Machine environment using remote method invocation in accordance with a preferred embodiment of the present invention.

With reference to FIG. 4, a block diagram is shown illustrating Java Virtual Machine environment using remote method invocation in accordance with a preferred embodiment of the present invention. User 410 issues a command to windows console 420. The windows console then sends the command to client JVM 430. The client JVM then sends the command to server JVM 440 via RMI. The server JVM processes the command and returns results to client JVM 430 via RMI. The client JVM then passes the results to windows console 420 and the windows console presents the results to user 410.

Figure 5:
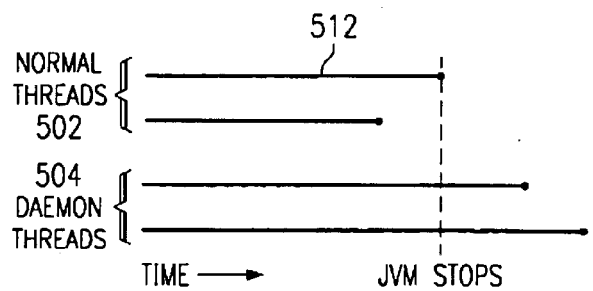
FIG. 5 is a diagram illustrating a plurality of threads in a prior art Java Virtual Machine.

With reference now to FIG. 5, a diagram is shown illustrating a plurality of threads in a prior art Java Virtual Machine. Normal threads 502 and daemon threads 504 are running in the JVM. Daemon threads 504 may be threads created by RMI code in a server application. When the server application shuts down, the JVM may exit when normal thread 512 completes execution.

The JVM will exit when this condition is met regardless of the state of daemon threads 504 still running in the JVM. Thus, any data stored by or operations in progress by daemon threads 504 in the JVM may potentially be lost. Also, any persistent files that the daemon threads are working with may potentially be corrupted or only partially updated, resulting in data files in an unknown state.

Figure 6:
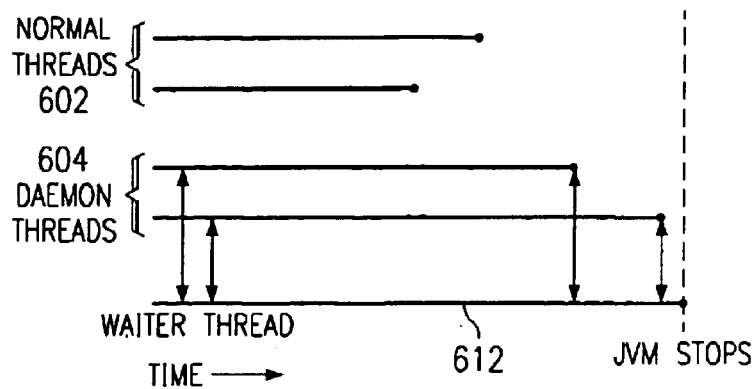
FIG. 6 is a diagram illustrating a waiter thread in a Java Virtual Machine in accordance with a preferred embodiment of the present invention.

Turning now to FIG. 6, a diagram is shown illustrating a waiter thread in a Java Virtual Machine in accordance with a preferred embodiment of the present invention. Normal threads 602 and daemon threads 604 are running in the JVM. Daemon threads 604 may be threads created by RMI code in a server application.

In accordance with a preferred embodiment of the present invention, waiter thread 612 is created to prevent premature exit of the JVM during the shutdown process of the server application by waiting for any daemon threads in the JVM to complete execution. Using this mechanism, any daemon thread flagged by the application runs to completion before the JVM is allowed to exit. Once all flagged daemon threads exit, the waiter thread exits and allows the server application to properly terminate.

The waiter thread uses an efficient mechanism to maintain a queue of threads. When a daemon thread is flagged, it is simply appended to the end of the queue. The waiter thread waits for the first thread in the queue to complete. Once the first thread in the queue completes, it is removed from the queue. At this point, the queue is searched for any other inactive threads and those threads are also removed from the queue. This allows the waiter thread to efficiently manage the queue and keep the memory and resource requirements to a minimum.

When there are no threads in the queue, the waiter thread enters an efficient wait state waiting on a specified Java object. When a new thread is flagged, this Java object is notified which wakes up the waiter thread. At the point when the application wants to shutdown, it signals the waiter thread to shutdown. The waiter thread then continues to wait on all threads in the queue until the queue is empty. Once the queue is empty, the waiter thread may terminate, allowing the JVM to exit and the server application to shutdown.

Figure 7:
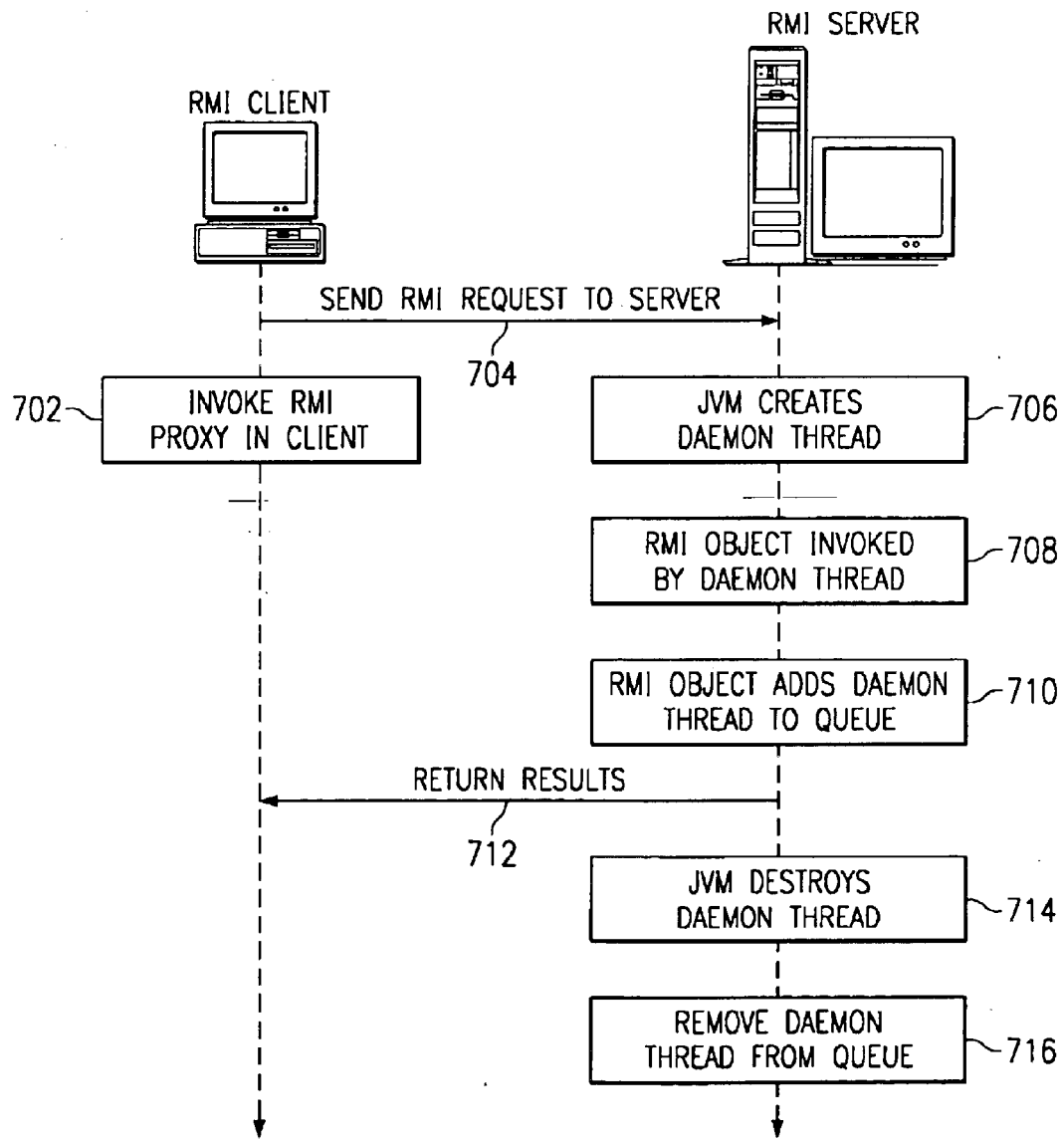
FIG. 7 is a data flow diagram illustrating an RMI transaction in accordance with a preferred embodiment of the present invention.

With reference to FIG. 7, a data flow diagram is shown illustrating an RMI transaction in accordance with a preferred embodiment of the present invention. The RMI client invokes an RMI proxy in the client (step 702) and sends an RMI request to the server (step 704). The server JVM creates a daemon thread (step 706) and the RMI object in the server is invoked by the daemon thread (step 708). Then, the RMI object adds the daemon thread to the queue in the waiter thread (step 710). After processing the request, the RMI object returns the results to the client (step 712). Thereafter, the JVM destroys the daemon thread (step 714) and the daemon thread is removed from the queue in the waiter thread (step 716).

If the daemon thread is the first thread in the queue, the waiter thread wakes up and clears all finished threads from the queue. If the daemon thread is not the first thread in the queue, then the daemon thread is cleared when the first daemon thread in the queue is destroyed. Having the waiter thread poll each thread in the queue or remove a thread from the queue every time a daemon thread finishes may be very resource intensive. Thus, in a preferred embodiment of the present invention, the waiter thread remains in an efficient wait state until the first daemon thread in the queue finishes. Then, the waiter thread wakes up and clears all finished threads from the queue.

With reference now to FIG. 8, a flowchart is shown illustrating the operation of a server JVM implementing a waiter thread in accordance with a preferred embodiment of the present invention. The process begins and waits for notification of a new server thread being started in the server JVM (step 802). A determination is made as to whether the thread is the first thread (step 804). If the thread is the first thread, the process starts the waiter thread (step 806) and adds the thread to the wait queue of the waiter thread (step 808). If the thread is not the first thread in step 804, the process proceeds directly to step 808 to add the thread to the wait queue.

Thereafter, a determination is made as to whether the wait queue is empty (step 810). If the wait queue is not empty, the process waits for the first thread in the wait queue to complete execution (step 812), removes all finished threads from the wait queue (step 814), and returns to step 810 to determine whether the wait queue is empty.

If the wait queue is empty in step 810, a determination is made as to whether the server application is shutting down (step 816). If the server application is shutting down, the process stops the waiter thread (step 818) and ends. If the server application is not shutting down in step 816, the process returns to step 802 to wait for a new server thread to be started in the server JVM.

While FIG. 8 illustrates the general operation of a server JVM implementing a waiter thread, the present invention may also be implemented based on the following pseudocode:

```
public class WaiterThread implements Runnable
{
    /**
     * The static initializer for WaiterThread; simply starts a thread
     * for this class.
     */
    static
    {
        initialize a shutdown flag to false
        create an empty queue for daemon threads
        create and start new normal thread called "WaiterThread"
    }
    /**
     * Adds the current thread to the list of threads to wait for at shutdown.
     */
    public static void add ( )
    {
        query the Thread object of the thread calling this method
            if this Thread object is a daemon thread
            {
                add this Thread object to the end of the queue
                send a notify signal to the WaiterThread
            }
    }
    /**
     * Requests the WaiterThread to shutdown.
     */
    public static void shutdown ( )
    {
        set the shutdown flag to true
        send a notify signal to the WaiterThread
    }
    /**
     * The run method for WaiterThread.
     */
    public void run ( )
    {
        loop until the shutdown flag is true AND the
```

-continued

```
queue is empty
    {
        if the queue is empty
        {
            enter efficient wait state; wait to be
notified by the add or shutdown method
        }
        else
        {
            get the first daemon thread in the queue
            enter efficient wait state; wait for first
daemon thread to finish
            loop through each daemon thread in the queue
            {
                if the thread has finished
                {
                    remove it from the queue
                }
            }
        }
    }
}
```

Thus, the present invention solves the disadvantages of the prior art by creating a single normal Java thread referred to as a "waiter" thread. The waiter thread is used to prevent premature exit of the Java Virtual Machine during the shutdown process of the server application by waiting for any daemon threads in the JVM to complete execution. Using this mechanism, any daemon thread flagged by the application runs to completion before the JVM is allowed to exit. Once all flagged daemon threads exit, the waiter thread exits and allows the server application to properly terminate.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for preventing premature shutdown of a virtual machine, comprising the steps of:

starting a waiter thread in the virtual machine;

registering daemon threads in a queue managed by the waiter thread;

monitoring, by the waiter thread, the daemon threads registered in the queue managed by the waiter thread; and preventing shutdown of the virtual machine so long as any of the monitored daemon threads are running in the virtual machine.

2. The method as recited in claim 1, further comprising the step of:

responsive to a first daemon thread becoming inactive, searching for other inactive daemon threads registered in the queue.

3. The method as recited in claim 1, further comprising the step of:

responsive to a new daemon thread being created, appending the new daemon thread to the end of the queue.

4. The method as recited in claim 1, further comprising the steps of:

determining whether the queue is empty; and if the queue is empty, terminating the waiter thread.

5. The method as recited in claim 4, wherein the virtual machine shuts down in response to termination of the waiter thread.

6. The method as recited in claim 1, wherein the waiter thread is a normal thread.

7. The method as recited in claim 1, wherein the daemon threads are created by remote method invocation code.

8. An apparatus for preventing premature shutdown of a virtual machine, comprising:

starting means for starting a waiter thread in the virtual machine;

registration means for registering daemon threads in a queue managed by the waiter thread;

monitoring means for monitoring, by the waiter thread, the daemon threads registered in the queue managed by the waiter thread; and preventing means for preventing shutdown of the virtual machine so long as any of the monitored daemon threads are running in the virtual machine.

9. The apparatus as recited in claim 8, further comprising:

means, responsive to a first daemon thread becoming inactive, for searching for other inactive daemon threads registered in the queue.

10. The apparatus as recited in claim 8, further comprising:

means for appending the new daemon thread to the end of the queue, responsive to a new daemon thread being created.

11. The apparatus as recited in claim 8, further comprising:

determination means for determining whether the queue is empty; and means for terminating the waiter thread if the queue is empty.

12. The apparatus as recited in claim 11, wherein the virtual machine shuts down in response to termination of the waiter thread.

13. The apparatus as recited in claim 8, wherein the waiter thread is a normal thread.

14. The apparatus as recited in claim 8, wherein the daemon threads are created by remote method invocation code.

15. A computer program product, in a computer readable medium, for preventing premature shutdown of a virtual machine, comprising:

first instructions for starting a waiter thread in the virtual machine;

second instructions for registering daemon threads in a queue managed by the waiter thread;

third instructions for monitoring, by the waiter thread, the daemon threads registered in the queue managed by the waiter thread; and fourth instructions for preventing shutdown of the virtual machine so long as any of the monitored daemon threads are running in the virtual machine.

16. The computer program product as recited in claim 15, further comprising:

fifth instructions for responsive to a first daemon thread becoming inactive, searching for other inactive daemon threads registered in the queue.

17. The computer program product as recited in claim 15, further comprising:

sixth instructions for determining whether the queue is empty; and seventh instructions for terminating of the waiter thread if the queue is empty.

* * * * *